(12) United States Patent
Harris et al.

(10) Patent No.: US 12,466,336 B2
(45) Date of Patent: Nov. 11, 2025

(54) TAILGATE PROTECTOR STRUCTURE WITH MODULAR ACCESSORY ATTACHMENTS

(71) Applicant: TOYOTA MOTOR ENGINEERING & MANUFACTURING NORTH AMERICA, INC., Plano, TX (US)

(72) Inventors: Ryan C. Harris, Saline, MI (US); Scott L. Frederick, Brighton, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

(*) Notice: Subject to any disclaimer, the term of this patent is extended or adjusted under 35 U.S.C. 154(b) by 311 days.

(21) Appl. No.: 17/744,195

(22) Filed: May 13, 2022

(65) Prior Publication Data
US 2023/0365075 A1   Nov. 16, 2023

(51) Int. Cl.
*B60R 13/01* (2006.01)
*B62D 33/027* (2006.01)

(52) U.S. Cl.
CPC ........ *B60R 13/01* (2013.01); *B60R 2013/016* (2013.01); *B62D 33/0273* (2013.01)

(58) Field of Classification Search
CPC .......... B62D 33/0273; B60R 2013/016; B60R 13/01
See application file for complete search history.

(56) References Cited

U.S. PATENT DOCUMENTS

| 5,037,019 | A | * | 8/1991 | Sokn | B60R 9/00 224/570 |
|---|---|---|---|---|---|
| 5,257,728 | A | * | 11/1993 | Gibson | B60R 9/08 224/325 |
| 5,704,678 | A | * | 1/1998 | Elwell | B60R 13/04 296/39.2 |
| 9,533,625 | B2 | | 1/2017 | Krishnan | |
| 10,406,988 | B2 | | 9/2019 | Cha | |
| 10,703,295 | B2 | * | 7/2020 | Leff Yaffe | B60R 9/06 |
| 10,857,950 | B2 | | 12/2020 | Cox | |
| 11,142,133 | B1 | | 10/2021 | Oshman | |
| 11,273,694 | B2 | * | 3/2022 | Facchinello | B60P 7/02 |
| 2004/0212209 | A1 | * | 10/2004 | Vitoorapakorn | B60R 13/01 296/39.2 |
| 2005/0275241 | A1 | * | 12/2005 | Rothwell | B60R 11/00 296/136.01 |
| 2017/0144520 | A1 | * | 5/2017 | Hemphill | B60P 7/0807 |
| 2019/0047483 | A1 | | 2/2019 | Wilterdink | |
| 2022/0001808 | A1 | * | 1/2022 | Low | B60J 11/06 |
| 2022/0379817 | A1 | * | 12/2022 | Gu | B60R 9/06 |

FOREIGN PATENT DOCUMENTS

FR   3086241 B1   10/2020

* cited by examiner

*Primary Examiner* — Derek J Battisti
(74) *Attorney, Agent, or Firm* — SHEPPARD, MULLIN, RICHTER & HAMPTON LLP; Daniel N. Yannuzzi

(57) ABSTRACT

The application generally relates to an apparatus comprising a tailgate protector having a base disposed atop a first portion of a tailgate, a support arm extending from a first edge of the base, and one or more mounting elements disposed within the base, wherein the one or more mounting elements are configured to removably couple an attachment via one or more attachment mounting elements includes in the attachment.

20 Claims, 7 Drawing Sheets

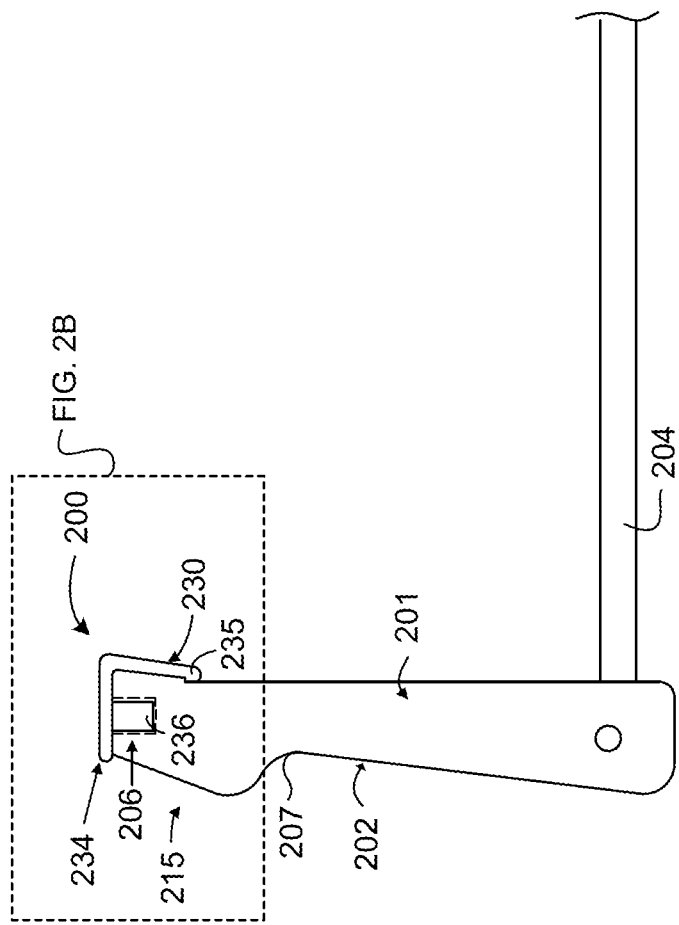

TAILGATE PROTECTOR STRUCTURE WITH MODULAR ACCESSORY ATTACHMENTS

TECHNICAL FIELD

The present disclosure relates generally to a storage compartment apparatus, and in particular, some implementations may relate to a tailgate mounted apparatus for securing cargo items in a truck bed.

DESCRIPTION OF RELATED ART

Pickup trucks are used to haul and move various items. However, items often shift and move around in the truck bed during normal driving conditions. In addition, some items that are larger than the truck bed or fit awkwardly in a truck bed, are typically hung over a top portion/"lip" of the tailgate. Aftermarket accessories that attach to the tailgate of the vehicle can protect and prevent these items from shifting. However, these aftermarket accessories are not easily interchangeable to accommodate different items, such as bicycles and surfboards.

BRIEF SUMMARY OF THE DISCLOSURE

In some aspects, the techniques described herein relate to an apparatus having a base disposed atop a first portion of a tailgate, a support arm extending from a first edge of the base and contacting a second portion of the tailgate, and one or more mounting elements disposed within the base, wherein the one more mounting elements are configured to removably couple an attachment via one or more attachment mounting elements included in the attachment.

In one embodiment, the techniques described herein relate to an apparatus having a plurality of tailgate attachments including: one or more attachment mounting elements configured to removably couple the plurality of tailgate attachments to a tailgate protector, wherein the tailgate protector includes an attachment mechanism configured to couple the one or more attachment mounting elements to the tailgate protector; and a storage mechanism configured to secure a plurality of items to a tailgate of a vehicle, wherein each one of the plurality of tailgate attachments includes a unique storage mechanism.

In one embodiment, the techniques described herein relate to an apparatus that includes a tailgate protector having a base, wherein the base includes a plurality of mounting elements, and an attachment that includes a storage mechanism, and a plurality of attachment mounting elements, wherein the attachment mounting elements are configured to removably couple the attachment to the tailgate protector by securely coupling the plurality of mounting elements to the plurality of attachment mounting elements.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 2A is an example illustration of a cross-section of a tailgate of a vehicle, according to one embodiment.

The figures are not exhaustive and do not limit the present disclosure to the precise form disclosed.

DETAILED DESCRIPTION

Items stored in a bed of a vehicle are often damaged from rolling around during normal driving conditions. Some aftermarket accessories attach to a tailgate of the vehicle to protect the tailgate, and keep items from shifting. However, these accessories are not easily interchangeable. For example, if a user is attempting to secure a surfboard, they must use a special foam attachment to secure the surfboard to the tailgate. If the user decides to subsequently store a bicycle, they have to remove/replace the special foam attachment with a special bicycle attachment. This results in a nuisance for users who require storage of different items, as they have to use a different aftermarket accessory for each application.

Thus, there is need for a tailgate protector that may receive/accept different attachments for securing different types and sizes of items. The attachments can be easily swapped and configured based on customer usage and type of items being loaded.

As found in at least one embodiment, the tailgate protector includes a plurality of attachments to secure a variety of different items. For example, in one embodiment, the attachments may include a bike storage attachment, a tie down attachment, and a carriage attachment. It should be noted, that the names of the exemplary attachments do not limit the intended use of each attachment, as the exemplary attachments are not necessarily limited to use with the specific types of items, and other attachments are contemplated as well.

Each one of the plurality of attachments can be removably coupled to the tailgate protector by an attachment mounting element. Each attachment includes a plurality of attachment mounting elements that protrude outwardly from the body of the attachment to mate with a mounting element of the tailgate protector. Thereby securely fixing the attachment into place with the tailgate protector. Each attachment can also be easily removed and replaced with a different attachment better suited for a different item.

Figure 1:
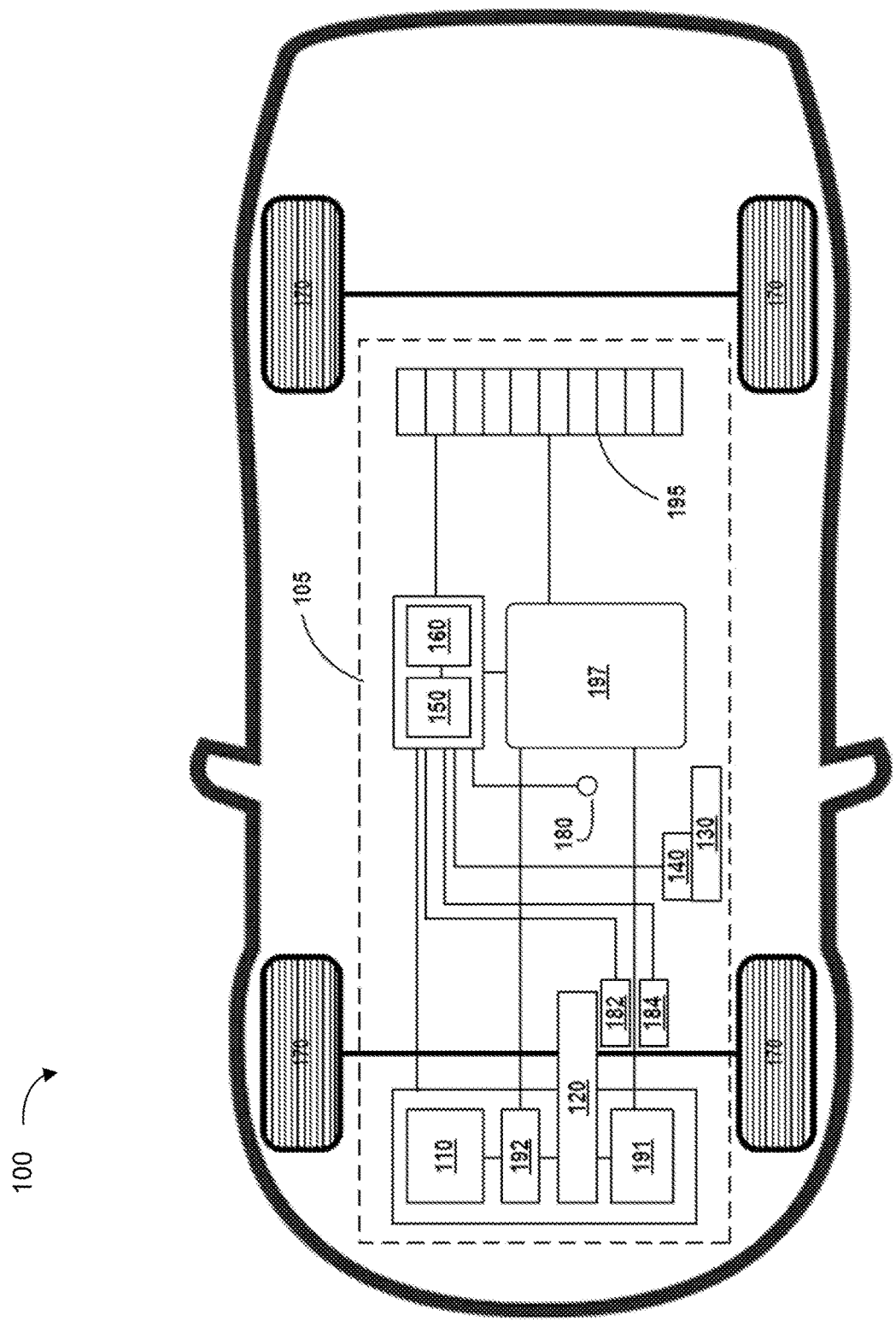
FIG. 1 is a schematic representation of an example vehicle with which embodiments of the systems and methods disclosed herein may be implemented.

The systems and methods disclosed herein may be implemented with any of a number of different vehicles and vehicle types. For example, the systems and methods disclosed herein may be used with automobiles, trucks, motorcycles, recreational vehicles and other like on- or off-road vehicles. In addition, the principals disclosed herein may also extend to other vehicle types as well. An example of a hybrid electric vehicle (HEV) in which embodiments of the disclosed technology may be implemented is illustrated in FIG. 1. Although the example described with reference to FIG. 1 is a hybrid type of vehicle, the systems and methods can be implemented in other types of vehicle including gasoline- or diesel-powered vehicles, fuel-cell vehicles, electric vehicles, or other vehicles.

FIG. 1 illustrates an example hybrid electric vehicle (HEV) 100 in which various embodiments for autonomous and semi-autonomous steering alterations based on a driver profile may be implemented. It should be understood that various embodiments disclosed herein may be applicable to/used in various vehicles (internal combustion engine (ICE) vehicles, fully electric vehicles (EVs), etc.) that are fully or partially autonomously controlled/operated, and not solely HEVs.

Here, HEV 100 includes drive force unit 105 and wheels 170. Drive force unit 105 includes an engine 110, motor generators (MGs) 191 and 192, a battery 195, an inverter 197, a brake pedal 130, a brake pedal sensor 140, a transmission 120, a memory 160, an electronic control unit (ECU) 150, a shifter 180, a speed sensor 182, and an accelerometer 184.

Engine 110 primarily drives the wheels 170. Engine 110 can be an ICE that combusts fuel, such as gasoline, ethanol, diesel, biofuel, or other types of fuels which are suitable for combustion. The torque output by engine 110 is received by the transmission 120. MGs 191 and 192 can also output torque to the transmission 120. Engine 110 and MGs 191 and 192 may be coupled through a planetary gear (not shown in FIG. 1). The transmission 120 delivers an applied torque to the wheels 170. The torque output by engine 110 does not directly translate into the applied torque to the wheels 170.

MGs 191 and 192 can serve as motors which output torque in a drive mode, and can serve as generators to recharge the battery 195 in a regeneration mode. The electric power delivered from or to MGs 191 and 192 passes through inverter 197 to battery 195. Brake pedal sensor 140 can detect pressure applied to brake pedal 130, which may further affect the applied torque to wheels 170. Speed sensor 182 is connected to an output shaft of transmission 120 to detect a speed input which is converted into a vehicle speed by ECU 150. Accelerometer 184 is connected to the body of HEV 100 to detect the actual deceleration of the vehicle 100, which corresponds to a deceleration torque.

Transmission 120 is a transmission suitable for an HEV. For example, transmission 120 can be an electronically controlled continuously variable transmission (ECVT), which is coupled to engine 110 as well as to MGs 191 and 192. Transmission 120 can deliver torque output from a combination of engine 110 and MGs 191 and 192. The ECU 150 controls the transmission 120, utilizing data stored in memory 160 to determine the applied torque delivered to the wheels 170. For example, ECU 150 may determine that at a certain vehicle speed, engine 110 should provide a fraction of the applied torque to the wheels while MG 191 provides most of the applied torque. ECU 150 and transmission 120 can control an engine speed (NE) of engine 110 independently of the vehicle speed (V).

ECU 150 may include circuitry to control the above aspects of vehicle operation. ECU 150 may include, for example, a microcomputer that includes a one or more processing units (e.g., microprocessors), memory storage (e.g., RAM, ROM, etc.), and I/O devices. ECU 150 may execute instructions stored in memory to control one or more electrical systems or subsystems in the vehicle. ECU 150 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., anti-lock braking system (ABS) or electronic stability control (ESC)), battery management systems, and so on. These various control units can be implemented using two or more separate electronic control units, or using a single electronic control unit.

MGs 191 and 192 each may be a permanent magnet type synchronous motor including for example, a rotor with a permanent magnet embedded therein. MGs 191 and 192 may each be driven by an inverter controlled by a control signal from ECU 250 so as to convert direct current (DC) power from battery 195 to alternating current (AC) power, and supply the AC power to MGs 191, 192. MG 192 may be driven by electric power generated by motor generator MG 191. It should be understood that in embodiments where MG 191 and MG 192 are DC motors, no inverter is required. The inverter, in conjunction with a converter assembly may also accept power from one or more of MGs 191, 192 (e.g., during engine charging), convert this power from AC back to DC, and use this power to charge battery 95 (hence the name, motor generator). ECU 150 may control the inverter, adjust driving current supplied to MG 192, and adjust the current received from MG 91 during regenerative coasting and braking.

Battery 195 may be implemented as one or more batteries or other power storage devices including, for example, lead-acid batteries, lithium ion, and nickel batteries, capacitive storage devices, and so on. Battery 195 may also be charged by one or more of MGs 191, 192, such as, for example, by regenerative braking or by coasting during which one or more of MGs 191, 192 operates as generator. Alternatively (or additionally, battery 195 can be charged by MG 191, for example, when HEV 100 is in idle (not moving/not in drive). Further still, battery 195 may be charged by a battery charger (not shown) that receives energy from engine 110. The battery charger may be switched or otherwise controlled to engage/disengage it with battery 195. For example, an alternator or generator may be coupled directly or indirectly to a drive shaft of engine 110 to generate an electrical current as a result of the operation of engine 110. Still other embodiments contemplate the use of one or more additional motor generators to power the rear wheels of a vehicle (e.g., in vehicles equipped with 4-Wheel Drive), or using two rear motor generators, each powering a rear wheel.

Battery 195 may also be used to power other electrical or electronic systems in the vehicle. Battery 195 can include, for example, one or more batteries, capacitive storage units, or other storage reservoirs suitable for storing electrical energy that can be used to power MG 191 and/or MG 192. When battery 195 is implemented using one or more batteries, the batteries can include, for example, nickel metal hydride batteries, lithium ion batteries, lead acid batteries, nickel cadmium batteries, lithium ion polymer batteries, and other types of batteries.

Figure 2B:
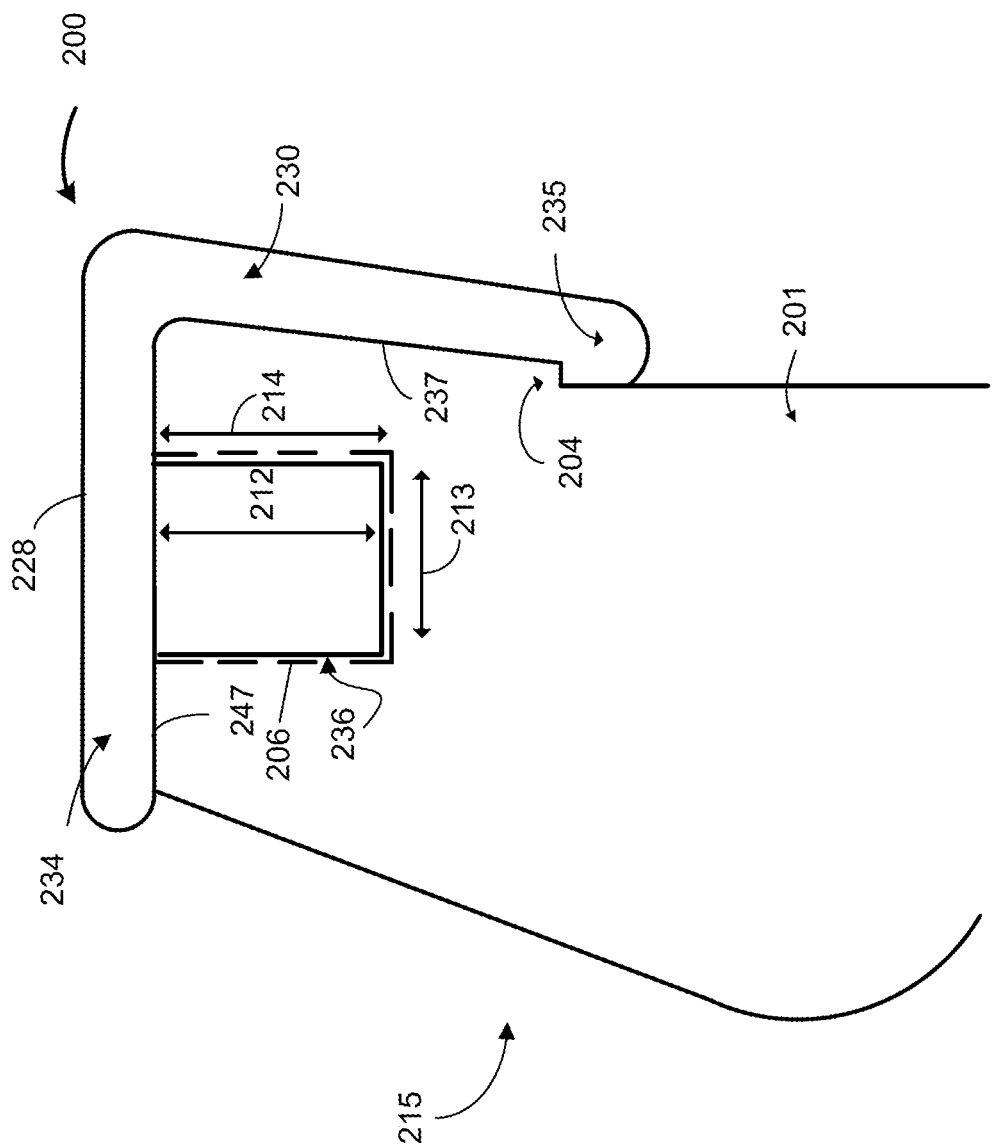
FIG. 2B is an example illustration of the cross-section of the tailgate of the vehicle, according to one embodiment.

FIGS. 2A-2B are example illustrations of a cross-sectional view of a tailgate 201 of a vehicle according to one embodiment. FIGS. 2A-2B include a tailgate protector 200 coupled to the tailgate 201. The tailgate 201 is operatively connected (in this example, via a hinged connection) to one end of the truck bed 204. The tailgate protector 200, includes a protector base 234, a protector arm 230, and a protector mounting element 236 coupled to the protector base 234. The tailgate protector 200 is removably coupled to the tailgate 201 by the protector arm 230, and the protector mounting element 236

Here, the protector arm 230 extends outwardly from the protector base 234 along the interior surface 237, of the tailgate 201. The protector arm 230 includes an arm support element 235 configured to couple the protector arm 230 of the tailgate protector 200 to a feature 204 (e.g., tab/protrusion) of the inner surface 237 of the tailgate 201. The support element 235 is not limited to the exemplary shape shown in FIGS. 2A-2B. The support element 235 can further include additional mechanisms not shown in FIGS. 2A-2B to couple the protector arm 230 to feature 204.

As seen in FIGS. 2A-2B, the tailgate protector 200 is further securedly (but removably) coupled to the tailgate by virtue of the mounting element 236. The mounting element 236 includes a width 213 and a height 212. In one embodiment, the height 212 of the mounting element 236 is about half of the length of the arm 230, and the width 213 mounting element 236 is about half of the length of the base 234. In another embodiment, the height 212 is about a third of the length of the arm 230, and the width 213 is about half the length of the arm. In another embodiment, the height 212 is about two thirds of the length of the arm 230, and the width 213 is about two thirds of the length of the base 234. It should be understood though, that mounting element 236 may be shaped/sized in a variety of ways so long as its shape/size can effectuate the desired retention to keep tailgate protector 200 in place during use/while in transit.

As seen in FIGS. 2A-2B, the mounting element 236 is disposed to fit into a port 206 (e.g., cavity). Here, the port 206 extends a vertical distance 214 into the body 201 of the tailgate 201. As seen in FIGS. 2A-2B, the mounting element 236 outwardly protrudes from the bottom surface 247 of the tailgate protector 200 into a corresponding port 206 in the upper portion 215 of the tailgate 201, to secure the tailgate protector 200 to the tailgate 201 without affecting the top surface 228 of the tailgate protector 200. Since the mounting element 236 fits into the corresponding port 206, it is hidden from view.

Figure 3:
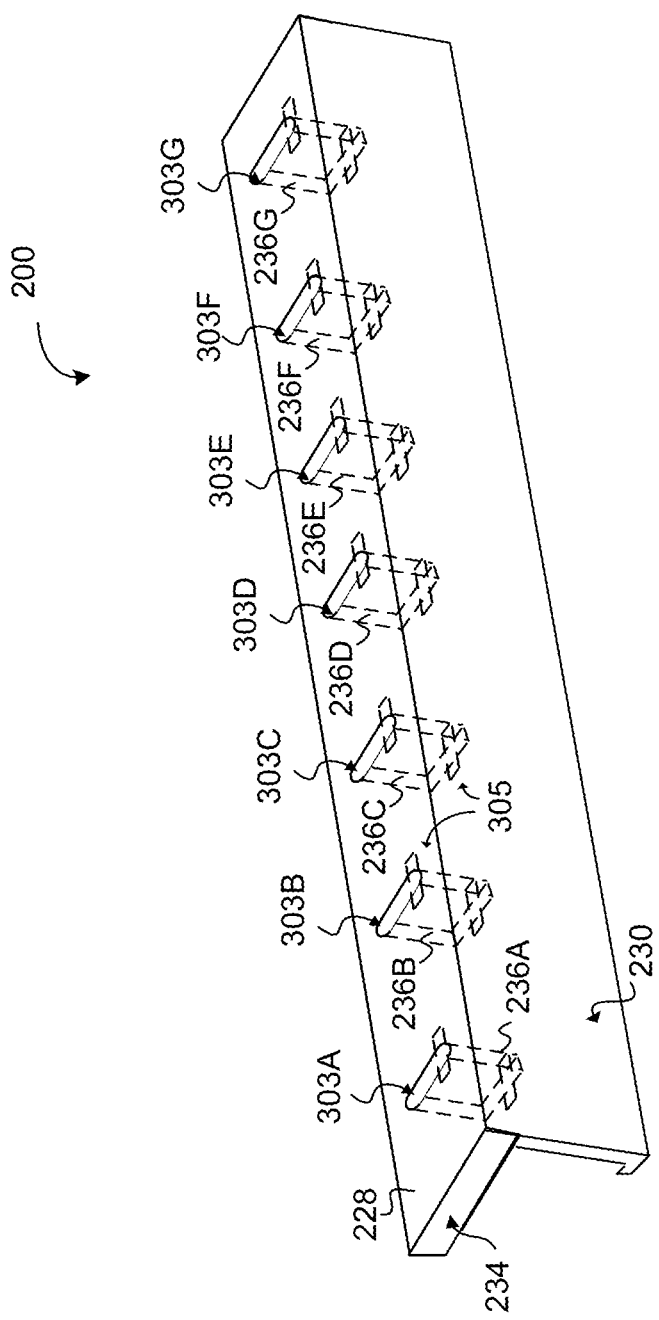
FIG. 3 is an example illustration of the tailgate protector, according to one embodiment

As seen in FIGS. 3 and 4, the mounting element 236 includes a hollow inner portion 303. The hollow inner portion 303 of each mounting element 236 is configured to receive an attachment mounting element 404. For example, each mounting element 236A-236G includes a hollow inner portion 303A-303G. Each attachment 400 includes a plurality of attaching mounting elements 404A, 404B configured to removably couple the each one of the plurality of attachments 400 to the tailgate protector 200.

FIG. 3 is an example illustration of the tailgate protector 200, according to one embodiment. As seen in FIG. 3, the tailgate protector 200 includes a plurality of mounting elements 236. Each mounting element 236 includes a hollow inner region 303. The hollow inner region 303 is configured to receive the attachment mounting element. The hollow inner region 303 can also be plugged with an insert (not shown) to create the uninterrupted surface 228, when the attachment mounting element is not in use. Each mounting element 236 can optionally include a T-locking mechanism 305 to securely fasten the plurality of attachment mounting elements 404 to the mounting elements 236.

The plurality of attachment mounting elements 404 can be removably coupled to the plurality of mounting elements 236 in a variety of different manners which effectuate coupling. For example, in one embodiment, the plurality of attachment mounting elements 404 are removably coupled to the plurality of mounting elements 236 using a friction fit such that the plurality of attachment mounting elements 404 are secured within the plurality of mounting elements 236.

In another embodiment, the plurality of mounting elements 236 are removably coupled via a snap-fit. In typical snap-fit configurations, a region of the mounting element 236 is slightly larger than an opening of the attachment mounting element 404A, 404B, thereby requiring a downward force to snap the mounting element into place. Although not shown, the plurality of mounting elements 236 can include a region of the mounting element 236 where the width is slightly wider than a region of the attachment element 236. The attachment mounting element 404A, 404B can therefore be secured by "snapping-in" both the mounting element 236 and the attachment mounting element 404A, 404B. Thus, one or more dimensional aspects of the attachment mounting element 404A, 404B and the mounting element 236 are configured such that friction between the mating surfaces of the attachment mounting element 404A, 404B and the mounting element 236 secure both elements.

In yet another embodiment, the plurality of attachment mounting elements 404 are removably coupled to the plurality of mounting elements 236 using a T-locking mechanism 305 in the mounting element 236. In this embodiment, each one of the plurality of attachment mounting elements 404 further include a T-locking element (not shown) that can be removably coupled to the T-locking mechanism 305 of the mounting elements 236 thereby securing each one of the plurality of attachment mounting elements 404. For example, the plurality of attachment mounting elements 404 can be removably coupled to the plurality of mounting elements 236 by sliding the attachment mounting elements 404 along the bottom surface (not shown) of the T-locking mechanism 305 to secure the T-locking element (not shown) to the mounting element 236.

The T-locking element can be oriented in any direction in a X-Y plane. For example, in one embodiment, the "T" of the T-slot can be positioned along the Y axis of an X-Y plane. In another direction the T-slot can be positioned along the X axis in the X-Y plane.

As seen in FIGS. 4A-6B, the tailgate protector can be removably coupled to a plurality of attachments. Each one of the plurality of attachments 400, 500, 600, includes a unique storage mechanism 401, 501, 601. For example, the attachment in FIG. 4, includes a storage mechanism 401 that includes a bike storage attachment 400. The attachment in FIG. 5, includes a storage mechanism 501 that includes a tie-down attachment 500. The attachment in FIG. 6, includes a storage mechanism 601 that includes a carrier attachment 600. Each one of the attachments 400, 500, and 600, can be removably coupled to the tailgate protector 200. Furthermore, each one of a the attachments 400, 500, and 600 can be easily replaced (e.g., swapped) for a different attachment 400, 500, 600. Thereby requiring a user to replace only the attachment 400, 500, and 600 when storing different types of items in the truck bed.

Figure 4A:
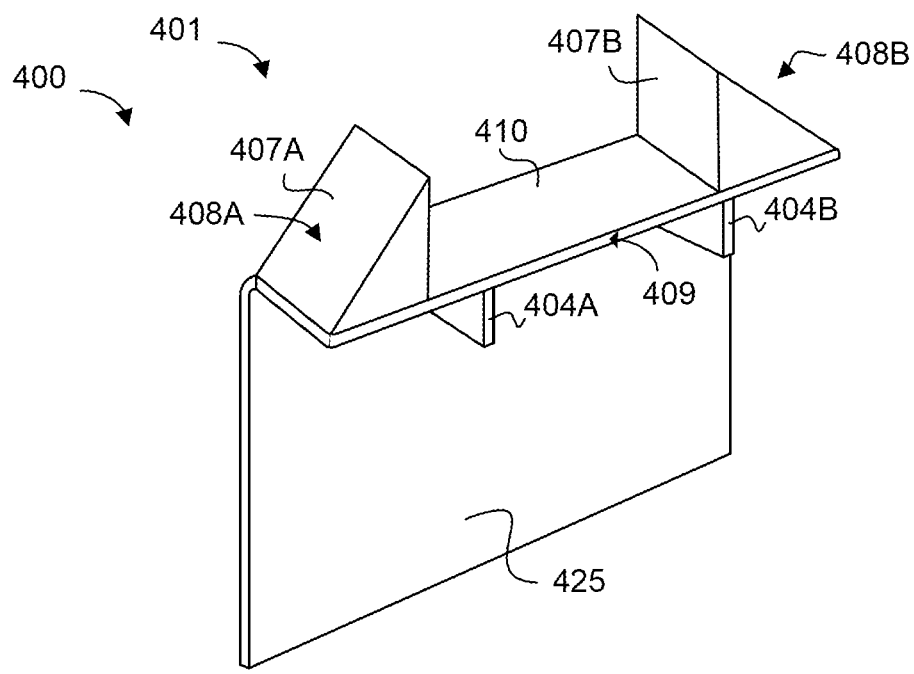
FIG. 4A is an example of a bike storage attachment for the tailgate protector, according to one embodiment.
Figure 4B:
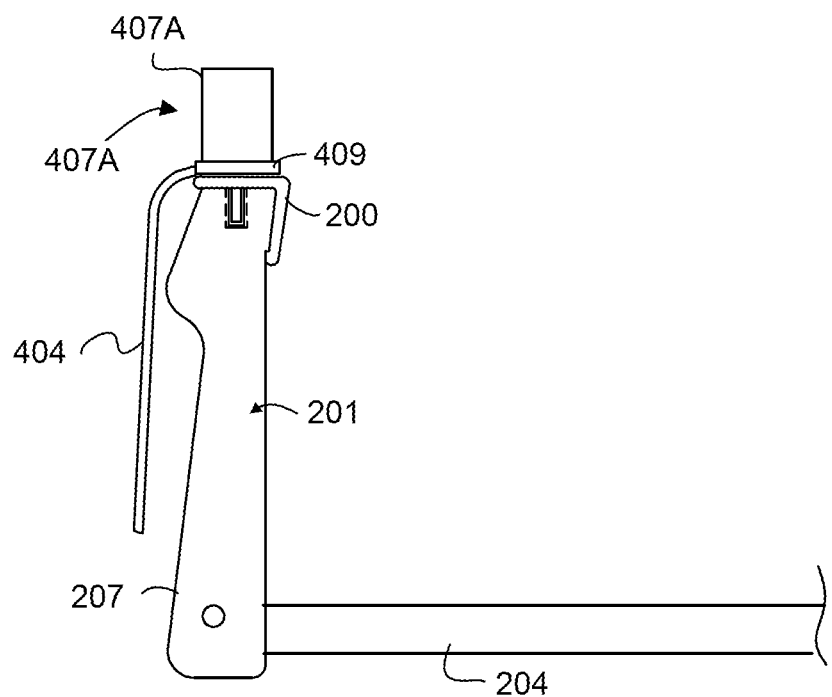
FIG. 4B is an example illustration of the tailgate protector with the bike storage attachment, according to one embodiment.

FIG. 4A is an example of the bike storage attachment 400 that can be removably coupled to the tailgate protector 200, according to one embodiment. FIG. 4B is an example illustration of the bike storage attachment 400, removably coupled to the tailgate protector 200, according to one embodiment. The bike storage attachment includes an attachment base 409 having a surface 410, a first sidewall 407A, a second sidewall 407B, a protector pad 425 to protect the outer panel 202 of the tailgate 201, and a plurality of attachment mounting elements 404A, 404B to attach the bike storage attachment 400 to the tailgate protector 200. Each sidewall 407A, 407B includes a first and second angular support feature 408A and 408B coupled to the base.

In one embodiment, the angular support features 408A, 408B are used to support one or more bicycles. For example, a bicycle can be positioned such that the front wheel hangs over the tailgate outer panel 202. To protect the surface 207 of the tailgate 201, the bike storage attachment 400 includes a tailgate protector pad 425. The rigid structure of each angular support feature 408A and 408B is further used to support the bicycle and prevent it from sliding around along the attachment base 409. In one embodiment, a divider (divider) is attached to the attachment base 409 and is disposed between each angular support feature 408A, 408B to keep the bicycle from sliding back and forth. In embodiments, where a bicycle is not being stored or transported, the divider can be used to support the cargo from sliding. For example, in one embodiment, a plurality of skis are stored using the bicycle storage attachment 400. Here, the bicycle storage attachment includes a divider for each set of skis to prevent the skis from sliding around in the attachment and truck bed.

Figure 5A:
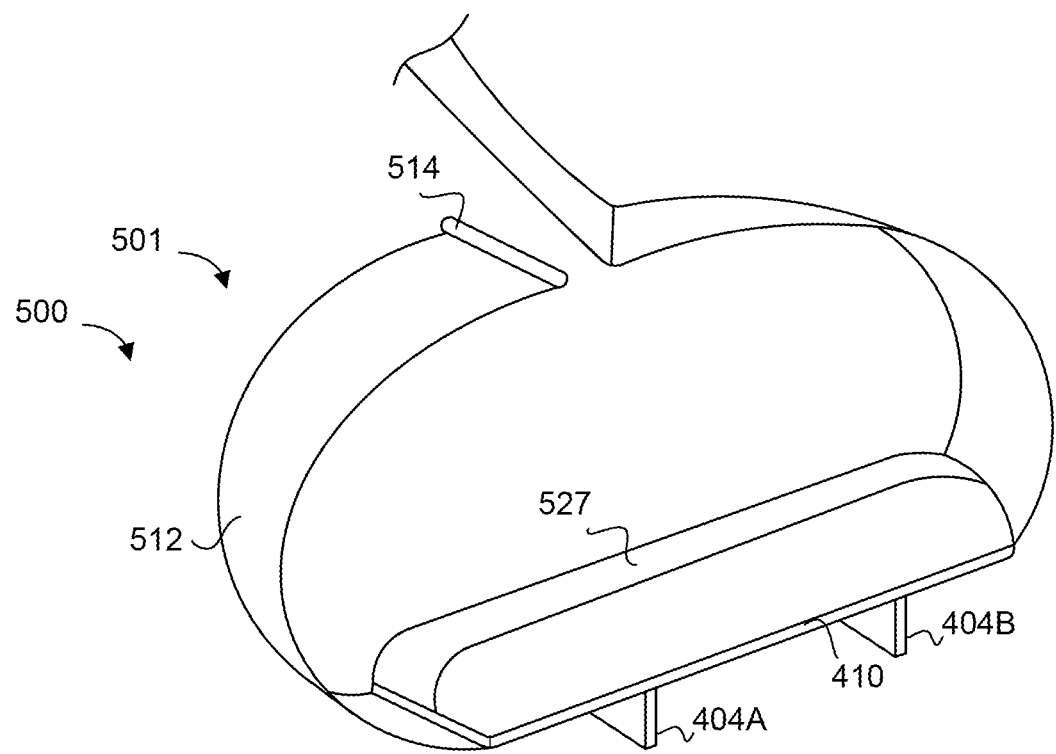
FIG. 5A is an example illustration of a tie-down attachment for the tailgate protector, according to one embodiment.
Figure 5B:
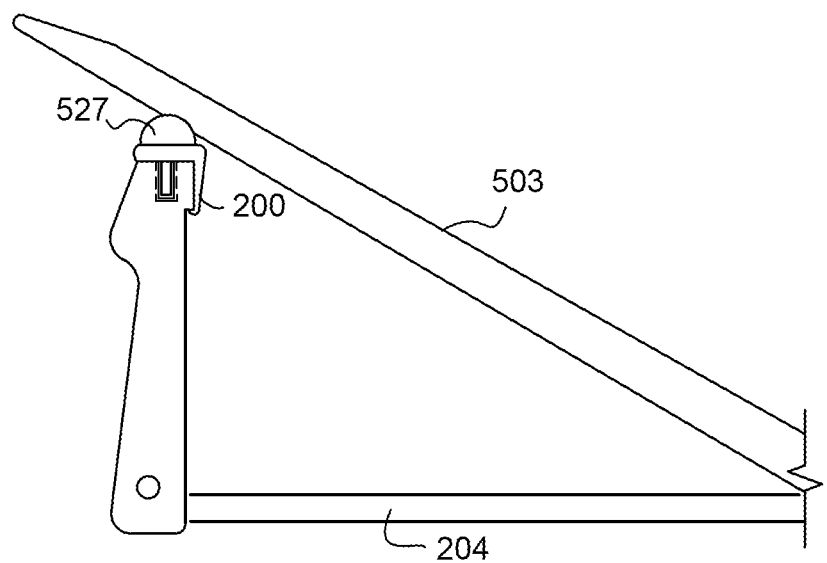
FIG. 5B is an example illustration of the tailgate protector with the tie-down attachment, according to one embodiment.

FIG. 5A is an example illustration of the tie-down attachment 500 that can be removably coupled to the tailgate protector 200, according to one embodiment. FIG. 5B is an example illustration of the tie-down attachment 500 removably coupled to the tailgate protector 200, according to one embodiment. The tie-down feature 512 includes a fastener mechanism 514 to secure the tie-down feature 512 about a storage item. Here, the base 410 of the tie-down attachment includes a base pad 527 to protect the storage item while it is secured to the tie-down attachment.

Here, the base pad 527 disposed over the attachment base 409 is used to protect the cargo. The tie-down feature 512 and fastener mechanism 514 are used to support the cargo. For example, in one embodiment, the tie-down attachment is used to support a surfboard 503. As seen in FIG. 4, the attachment includes a plurality of attachment mounting elements configured to securedly couple the attachment to the tailgate protector 200.

Figure 6A:
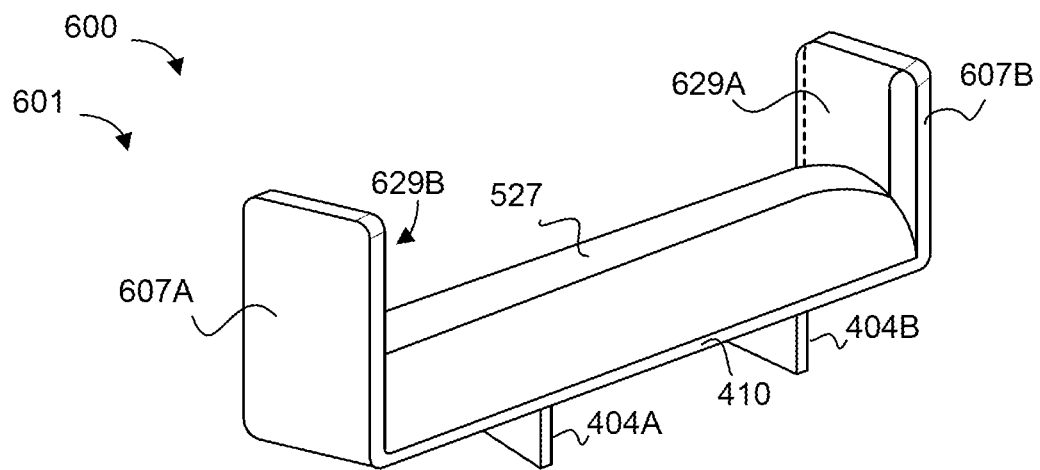
FIG. 6A is an example illustration of a carriage attachment for the tailgate protector, according to one embodiment.
Figure 6B:
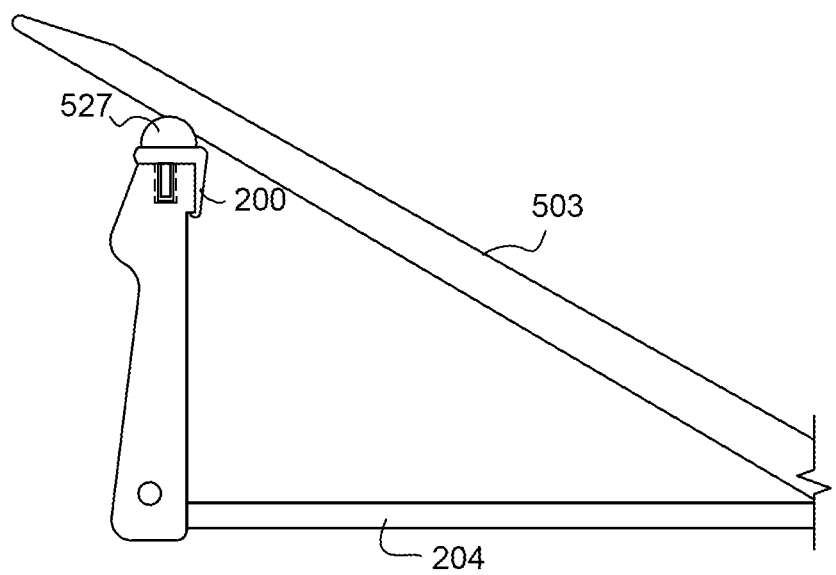
FIG. 6B is an example illustration of the tailgate protector with the carriage attachment, according to one embodiment.

FIG. 6A is an example illustration of the carriage attachment 600 that can be removably coupled to the tailgate protector 200, according to one embodiment. FIG. 6B is an example illustration of the carriage attachment 600 removably coupled to the tailgate protector 200, according to one embodiment.

Here, the carriage attachment 600 includes the attachment base 410, a first sidewall 607A and a second sidewall 607B. Each sidewall 607A, 607B is coupled to the base 410. Each sidewall 607A, and 607B further includes a sidewall pad 629A and 629B. As seen in FIG. 6A, the base includes the base pad 527. In this embodiment, the padded sidewalls 607A, 607B are used to support precious cargo. For example, as seen in FIG. 6B, the cargo can include a surfboard.

In one embodiment, the pad(s) of FIG. 5A and FIG. 6A include a material capable of absorbing shock imparted to the cargo by the vehicle. Appropriate materials include, but are not limited to, a foam or foam composite, a plastic or plastic composite, a rubber or rubber composite, a cloth, or cloth composite, a silica, or silica composite etc.

Furthermore, in some embodiments, each attachment can be configured to accept/use portions of other attachments. For example, in one embodiment, the bicycle attachment 400 can include the tie down of the tie down attachment 600 to additionally secure one or more bicycles. Thus, the individual aspects of each attachment 400, 500, and 600 are not necessarily limited to each attachment 400, 500, and 600 and can be easily interchanged between, or added to, each attachment.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. An apparatus comprising:
   a base disposed atop a first portion of a tailgate of a vehicle, the base comprising a first surface adjacent to the first portion of the tailgate and a second surface opposite the first surface of the base;
   a support arm extending from a first edge of the base downward along an inner surface of the tailgate and coupled to the inner surface of the tailgate;
   a plurality of mounting elements extending below the first surface in a first direction past a top surface of the first portion of the tailgate, wherein each of the plurality of mounting elements comprises an opening at the second surface and a hollow region extending from the second surface toward the first surface; and
   an attachment, comprising an attachment body portion configured to accept an item to be attached to the base and a plurality of attachment elements of a geometry to be inserted into a corresponding plurality of mounting elements;
   wherein each of the plurality of attachment elements and mounting elements are configured to removably couple the attachment to the second surface of the base via insertion of the attachment elements of the attachment, through the opening and into the hollow regions of corresponding ones of the plurality of mounting elements.

2. The apparatus of claim 1, wherein the attachment includes a bike storage attachment.

3. The apparatus of claim 1, wherein the attachment includes a tie down attachment.

4. The apparatus of claim 1, wherein the attachment includes a carriage attachment.

5. The apparatus of claim 1, wherein the plurality of mounting elements include a t-locking mechanism configured to securely couple the attachment to the base.

6. An apparatus comprising: a plurality of tailgate attachments, each tailgate attachment comprising: a plurality of attachment mounting elements configured to removably couple the tailgate attachment to a tailgate protector, wherein the tailgate protector includes a plurality of mounting elements each configured to receive the plurality of attachment mounting elements via a hollow region, the mounting elements extending below a first surface of a base of the tailgate protector in a first direction past a top surface of a first portion of the tailgate, wherein the plurality of mounting elements are configured to removably couple the tailgate protector to a tailgate; and a storage mechanism configured to secure a plurality of items to a tailgate of a vehicle, wherein each one of the plurality of tailgate attachments includes a unique storage mechanism.

7. The apparatus of claim 6, wherein the storage mechanism includes a bike storage attachment.

8. The apparatus of claim 6, wherein the storage mechanism includes a tie down attachment.

9. The apparatus of claim 6, wherein the storage mechanism includes a carriage attachment.

10. The apparatus of claim 6, wherein the plurality of attachment mounting elements include a t-locking mechanism configured to securely couple the plurality of tailgate attachments to the tailgate protector.

11. An apparatus comprising: a tailgate protector having a base and a top surface, wherein the base includes a plurality of mounting elements extending from the base below a first surface of the base in a first direction past a top surface of a first portion of a tailgate, wherein each of the plurality of mounting elements comprises a hollow region having an opening on the top surface; and an attachment comprising: a storage mechanism; and a plurality of attachment mounting elements, wherein the attachment mounting elements are configured to removably couple the attachment to the tailgate protector by securely coupling the plurality of mounting elements of the base of the tailgate protector to the plurality of attachment mounting elements of the attachment by receiving the plurality of attachment mounting elements in the hollow regions of the plurality of mounting elements.

12. The apparatus of claim 11, wherein the storage mechanism includes a bike storage attachment.

13. The apparatus of claim 11, wherein the storage mechanism includes a tie down attachment.

14. The apparatus of claim 11, wherein the storage mechanism includes a carriage attachment.

15. The apparatus of claim 11, wherein the plurality of mounting elements include a t-locking mechanism configured to securely couple the attachment to the tailgate protector.

16. The apparatus of claim 1, wherein the plurality of mounting elements are configured to removably couple the base to the first portion of the tailgate.

17. The apparatus of claim 1, wherein removably coupling the attachment comprises at least two attachment elements that are each received by one of the hollow regions of the plurality of mounting elements.

18. The apparatus of claim 1, wherein each of the plurality of mounting elements have a height, measured from the base in the first direction, that is at least half a length of the support arm.

19. The apparatus of claim 1, wherein the plurality of mounting elements comprises N mounting elements arranged along a length of the base in a second direction, wherein each of the plurality of mounting elements comprises a depth in the second direction and a width in a third direction perpendicular to the second direction, wherein the width of each of the plurality of mounting elements is larger than the depth of each of the plurality of mounting elements.

20. The apparatus of claim 1, wherein the support arm comprises a support element configured to couple to a feature of the inner surface of the tailgate.

* * * * *